May 29, 1934.　　　O. RICHTER　　　1,960,552
ELECTRIC DRIVE
Filed Feb. 28, 1930
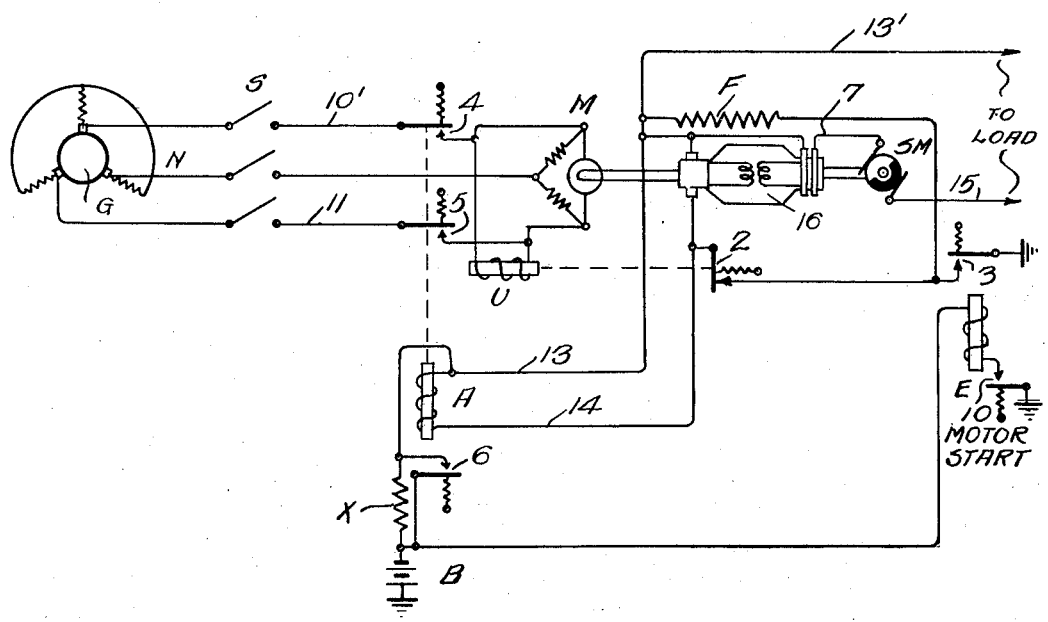
Inventor
Otto Richter
Wm Walter Owen. Atty.

Patented May 29, 1934

1,960,552

UNITED STATES PATENT OFFICE 1,960,552

ELECTRIC DRIVE

Otto Richter, Berlin-Charlottenburg, Germany, assignor to Siemens & Halske Aktiengesellschaft, Wernerwerk, Siemensstadt, near Berlin, Germany Application February 28, 1930, Serial No. 432,064
In Germany July 24, 1929

8 Claims. (Cl. 171—97)

The present invention relates to an arrangement for electric drive, which enables the drive (for example, of a current delivering machine) to be effected by motors fed from separate supplies of current.

Arrangements have already become known, in which a current delivering machine (for example, alternating current) is driven by a three-phase motor, and in which, when a fault occurs in the three-phase supply (for example, failure of one phase) a second unit is started up that is fed from another supply of current (for example, direct current supply or battery). Such arrangements are known, for example, for current delivering arrangements for signalling machines in telephone systems.

Hitherto it has been necessary to provide two signalling machines, which were coupled to motor-generators fed from separate current supplies. This second signalling machine provided for the sake of safety considerably increased the cost of such installations.

By means of the present invention the provision of a second signalling machine is avoided in a simple manner. This is achieved by rigidly coupling together several electric machines for driving the current delivering machine, the coupled driving machines being fed from separate sources of current.

Furthermore, the arrangement has the further important advantage that the unit is started up by direct current, and only after a certain speed has been reached is the three-phase motor connected to the network to take over the drive. This prevents the winding of the stationary three-phase motor being burnt out if it should happen that at the starting up of the unit one phase of the three-phase supply should have failed; thus it is not necessary to provide an automatic cut-out for the motor.

In the drawing is shown one example of the invention. Only those details are shown that are required for understanding the invention. The invention is not limited to this example. A current supply installation has been shown such as is used for signalling machines in telephone systems.

The current generating machine in this case takes the form of a single armature transformer or dynamotor, which may comprise the usual direct current armature winding with an additional generator armature winding also wound thereon, and which is driven by a three-phase motor. The latter is the preferred type of machine and is the type shown. The direct current side of the dynamotor is fed from the exchange battery B, so that when the three-phase supply fails, the machine is driven off the exchange battery, as will be explained hereafter. Obviously, a motor generator could be used in place of the dynamotor.

The three-phase motor M, the dynamotor 16 and the signalling machine SM, are all mounted on the same shafting. As illustrated, the signalling machine SM simply comprises an interrupter for the alternating signalling current, on conductors 7 and 13', generated by the dynamotor.

The arrangement is such that when a call is originated the signalling unit is started up under the control of a relay, which remains pulled up during the call; the relay is not shown but has the contact 10.

The switch S connects the three-phase supply N to the leads going to the three-phase motor M. But these leads are not switched through until the contacts 4 and 5 have been closed.

When a call is originated, the contact 10 is closed and the following circuit is established for the switching-on relay E: earth, contact 10, winding of relay E, battery B, earth. Relay E is operated and by closing its contact 3 supplies battery current to the field winding F over a circuit including the conductor 13 and the resistance X. A multiple branch of this circuit also includes the brushes and armature of the dynamotor, the conductor 14, and the relay A. The armature of the unit starts rotating upon closure of the traced circuits. A circuit, including the resistance X, the conductor 13, relay A, contacts 2 of relay U, and contacts 3 of the motor-start relay E is also completed at this time, but owing to the serially connected resistance X, the relay A cannot yet be operated in the circuit: earth, battery, resistance X, winding of relay A, contact 2, contact 3, earth. As the speed of rotation increases, the voltage increases in the direct current armature winding. When this has reached a certain value, the relay A pulls up and closes its contacts 4, 5, and 6. The leads 10' and 11 of the three-phase supply are connected by the contacts 4 and 5 to the three-phase motor M, which is, therefore, started up and takes over the driving of the dynamotor and the signalling machine. The switching-over relay U is operated by current from the three-phase supply and opens its contact 2, thereby removing the earthed side of the battery B from conductor 14 and from relay A. The relay A, however, maintains itself by means of the armature current generated by the dynamotor. The exciting field of the dynamotor is maintained energized over the closed contact 3. Alternating current is taken from the slip ring of the dynamotor over conductor 13' direct to the equipment to be operated; and over conductor 7 through the signalling machine SM, comprising an interrupter, to conductor 15, and to the other side of the equipment to be operated.

After the release of the speaking connection, the contact 10 is opened again, whereupon the relay E falls back and opens the circuit of the field winding F. Thereby direct current ceases to be supplied to the relay A; hence it falls back and at its contacts 4 and 5 disconnects the three-phase supply. The unit can then be taken into use again.

If one phase of the three-phase supply should fail or some other fault occur, the relay U falls back and closes its contact 2. Thereby, as the contact 3 has been closed, battery current is applied over the contacts 2 to the direct current armature, and the latter is thus again driven by the battery; hence the supply of current for the signalling machine SM is independent of the three-phase supply.

As the three-phase motor M is coupled with the dynamotor and the signalling machine on one shaft, it is also rotated during the battery drive.

The arrangement therefore enables one signalling machine to be saved and provides protection for the three-phase motor when one phase of the three-phase supply fails.

What is claimed is:

1. In combination with a dynamotor and an alternating current motor having their armatures upon a common shaft, sources of direct and alternating current, an operating circuit for said dynamotor including said direct current source, means for closing said circuit to start the dynamotor to deliver alternating current, means automatically operated, as soon as the dynamotor has attained a certain voltage, to connect the said alternating current motor to the alternating current source, means responsive consequent to such connection to open the operating circuit of said dynamotor, said means being also operated consequent to the failure of the alternating current source to reclose the operating circuit to the dynamotor.

2. In an alternating current supply system, a dynamotor and an alternating current motor mounted upon a common shaft, sources of direct and alternating current, an operating circuit for said dynamotor including said direct current source, means for closing said circuit to cause said dynamotor to rotate the shaft and deliver alternating current, means automatically operated, consequent to a certain voltage having been attained by said dynamotor, to close the operating circuit of said alternating current motor, and means operated, consequent to the closure of the latter operating circuit, to open the operating circuit of the dynamotor.

3. In an alternating current generating system, a shaft carrying the armatures of a dynamotor and of an alternating current motor, respectively, a set of commutator brushes co-operative with the armature of said dynamotor, a field winding for the dynamotor, an operating circuit for said dynamotor including a source of direct current, said field winding and the associated dynamotor armature, respectively, a relay operated to close said circuit to set the said shaft into motion to generate alternating current, a marginal relay in bridge of the commutator brushes of the dynamotor included in a branch of the circuit closed by said first relay and operated by an increase in current flow through it brought about by the decreased shunt effect of the armature resulting consequent to the shaft attaining speed, and an operating circuit for said alternating current motor including a source of alternating current closed by said relay.

4. In a machine for generating alternating current, an alternating current motor and a dynamotor having a common shaft carrying their armatures, an operating circuit for said dynamotor including a source of direct current, means for closing said circuit to initiate the operation of the machine, an operating circuit for said motor including a source of alternating current, means for subsequently automatically transferring the drive of the machine from the dynamotor portion thereof to the alternating current motor portion thereof, means operated consequent to the transferring action to open the first closed operating circuit, said means being also operated, upon any subsequent failure of the current supply to said alternating current motor, to reclose the operating circuit of the dynamotor so that the machine continues operation without interruption.

5. In an alternating current generating mechanism, a combined direct current motor and alternating current generator armature, a field winding for said armature, an alternating current motor having its armature mounted upon the shaft of said first armature, sources of direct and alternating current for operating said combined armature and the armature of said motor, means for connecting the direct current source to the direct current winding of said first-mentioned armature and to said field winding to start the operation of said armatures and the generation of alternating current by the alternating current winding of said armature, and means for thereafter automatically transferring the drive over to said alternating current motor and again operated consequent to the failure of said alternating current source for transferring back to the direct current drive in order to maintain the machine operating.

6. In a signal current generating mechanism, a dynamotor having a combined direct current motor and alternating current generator armature, and an alternating current motor having its armature mounted upon the shaft of the dynamotor armature, sources of direct and alternating current for operating said armatures, means for connecting up the direct current source to said dynamotor to start the operation of said armatures, means for thereafter automatically transferring the drive from the dynamotor to the alternating current motor, said last means also automatically transferring back from the alternating current drive to the direct current drive upon failure of the alternating current.

7. In a current generating mechanism, a dynamotor, a field winding for said dynamotor, an alternating current motor; a shaft supporting the armatures of said dynamotor and motor, respectively; separate sources of current for operating the dynamotor armature in order to generate alternating current, means for connecting one of said current sources to the dynamotor to operate it for the purpose set forth, means for thereafter automatically connecting the other current source to said motor causing it to drive the dynamotor; and means responsive, upon the connection of said other current source to said motor, to prevent further operation of said dynamotor by said first source.

8. In a current generating mechanism, a dynamotor, a field winding for said dynamotor, an alternating current motor; a shaft supporting the armatures of said dynamotor and motor, respectively; separate sources of current for operating the dynamotor armature in order to generate alternating current, means for connecting one of said current sources to the dynamotor to operate it for the purpose set forth, means for thereafter automatically connecting the other current source to said motor causing it to drive the dynamotor, means connected in multiple with said motor operable by current from said second source to disable the further operation of said dynamotor by said first source, said last means being also operated consequent to the failure of said second current source to enable the first specified source to again operate the dynamotor.

OTTO RICHTER.